（12）United States Patent
Schaner et al.

(10) Patent No.: US 11,485,162 B2
(45) Date of Patent: Nov. 1, 2022

(54) POLYURETHANE PROTECTIVE FILM (71) Applicant: Avery Dennison Corporation, Glendale, CA (US)

(72) Inventors: Jason Schaner, Novelty, OH (US); Michael Ramsay, Newbury, OH (US); Steven Reekmans, Leuven (BE); Xiang Liu, Glendale, CA (US)

(73) Assignee: Avery Dennison Corporation, Glendale, CA (US)

(*) Notice: Subject to any disclaimer, the term of this patent is extended or adjusted under 35 U.S.C. 154(b) by 740 days.

(21) Appl. No.: 14/569,946

(22) Filed: Dec. 15, 2014

(65) Prior Publication Data
US 2015/0184038 A1    Jul. 2, 2015

Related U.S. Application Data

(60) Provisional application No. 61/921,600, filed on Dec. 30, 2013.

(51) Int. Cl.
*C08J 5/18* (2006.01)
*B41M 5/025* (2006.01)
(Continued)

(52) U.S. Cl.
CPC .......... *B41M 5/0256* (2013.01); *B05D 3/007* (2013.01); *B29C 39/003* (2013.01); *B65C 9/00* (2013.01); *B65C 9/0015* (2013.01); *C08J 5/18* (2013.01); *C09J 7/29* (2018.01); *B29K 2075/00* (2013.01); *B29K 2105/0005* (2013.01); *B29K 2105/24* (2013.01); *B29L 2007/008* (2013.01);
(Continued)

(58) Field of Classification Search
None
See application file for complete search history.

(56) References Cited

U.S. PATENT DOCUMENTS 3,351,573 A   11/1967   Skreckoski
3,684,758 A    8/1972   Honig et al.
(Continued)

FOREIGN PATENT DOCUMENTS

CN   1090032    9/2002
CN   1537142   10/2004
(Continued)

OTHER PUBLICATIONS

Griffin, G.J.L, "Biodegradation of ethylene/vinylacetate copolymers," Proceedings of 3rd International Biodegradation Symposium, pp. 807-813, 1975.
(Continued)

*Primary Examiner* — Scott R. Walshon
*Assistant Examiner* — Thomas A Mangohig (57) ABSTRACT

A protective film that can be included in multi-layer film laminates for use in marketing, advertising campaigns, particularly outdoor or other environment impacted promotions and safety applications. The film includes at least two different polyurethane polymers and is free or substantially free of polyvinyl chloride based polymer. One polyurethane has an ultimate elongation less than 200%, and another polyurethane has an ultimate elongation more than 400%. The film may be transparent, translucent, clear or have other desirable optical properties.

33 Claims, 3 Drawing Sheets (51) Int. Cl.

| | | |
|---|---|---|
| *B05D 3/00* | (2006.01) | |
| *B29C 39/00* | (2006.01) | |
| *C09J 7/29* | (2018.01) | |
| *B65C 9/00* | (2006.01) | |
| *B41M 3/12* | (2006.01) | |
| *B29K 75/00* | (2006.01) | |
| *B29K 105/00* | (2006.01) | |
| *B29K 105/24* | (2006.01) | |
| *B29L 9/00* | (2006.01) | |
| *B29L 7/00* | (2006.01) | |
| *B41M 5/03* | (2006.01) | |

(52) U.S. Cl.
CPC ............ *B29L 2009/00* (2013.01); *B41M 5/03* (2013.01); *C08J 2375/04* (2013.01); *C08J 2475/04* (2013.01); *C09J 2475/006* (2013.01); *Y10T 428/1476* (2015.01); *Y10T 428/24802* (2015.01); *Y10T 428/28* (2015.01)

(56) References Cited

U.S. PATENT DOCUMENTS

| | | |
|---|---|---|
| 3,843,478 A | 10/1974 | Zuscik et al. |
| 3,870,521 A | 3/1975 | Mackey et al. |
| 4,069,186 A | 1/1978 | Ramig |
| 4,108,819 A | 8/1978 | Oyamada et al. |
| 4,198,330 A | 4/1980 | Kaizerman et al. |
| 4,416,749 A | 11/1983 | Mahr et al. |
| 4,436,520 A | 3/1984 | Llpko et al. |
| 4,532,189 A | 7/1985 | Mueller |
| 4,644,030 A | 2/1987 | Loewrigkeit et al. |
| 4,921,759 A | 5/1990 | Orain et al. |
| 4,935,470 A | 6/1990 | Tanuma et al. |
| 4,978,436 A | 12/1990 | Kelly |
| 4,983,461 A | 1/1991 | Daude et al. |
| 4,983,662 A | 1/1991 | Overbeek et al. |
| 5,030,505 A | 7/1991 | Dickinson |
| 5,041,517 A | 8/1991 | Vu et al. |
| 5,051,295 A | 9/1991 | Mori et al. |
| 5,060,981 A | 10/1991 | Fossum et al. |
| 5,102,737 A | 4/1992 | Josephy et al. |
| 5,104,928 A | 4/1992 | Craun et al. |
| 5,116,442 A | 5/1992 | Daude et al. |
| 5,120,154 A | 6/1992 | Lasch et al. |
| 5,135,797 A | 8/1992 | Sasaki et al. |
| 5,254,394 A | 10/1993 | Bothe et al. |
| 5,290,842 A | 3/1994 | Sasaki et al. |
| 5,306,374 A | 4/1994 | Hambright |
| 5,314,713 A | 5/1994 | Mori et al. |
| 5,324,467 A | 6/1994 | Anderson, II |
| 2,364,435 A | 12/1994 | Foster et al. |
| 5,376,430 A | 12/1994 | Swenson et al. |
| 5,420,195 A | 5/1995 | Mayer et al. |
| 5,422,189 A | 6/1995 | Warner et al. |
| 5,436,073 A | 7/1995 | Williams et al. |
| 5,458,935 A * | 10/1995 | Alzner .............. A61M 25/0009 264/209.1 |
| 5,468,532 A | 11/1995 | Ho et al. |
| 5,480,705 A | 1/1996 | Tolliver et al. |
| 5,486,426 A | 1/1996 | McGee et al. |
| 5,494,980 A | 2/1996 | Butler et al. |
| 5,508,105 A | 4/1996 | Orensteen et al. |
| 5,558,913 A | 9/1996 | Sasaki et al. |
| 5,562,962 A | 10/1996 | Tung |
| 5,567,761 A | 10/1996 | Song |
| 5,571,861 A | 11/1996 | Klein et al. |
| 5,578,669 A | 11/1996 | Odawa et al. |
| 5,585,193 A | 12/1996 | Josephy et al. |
| 5,593,785 A | 1/1997 | Mayo et al. |
| 5,594,065 A | 1/1997 | Tien et al. |
| 5,612,107 A | 3/1997 | Sangani et al. |
| 5,623,016 A | 4/1997 | Klein et al. |
| 5,643,669 A | 7/1997 | Tsuei |
| 5,662,997 A | 9/1997 | Onishi et al. |
| 5,672,413 A | 9/1997 | Taylor et al. |
| 5,688,573 A | 11/1997 | Goeb et al. |
| 5,691,425 A | 11/1997 | Klein et al. |
| 5,700,582 A | 12/1997 | Sargeant et al. |
| 5,702,790 A | 12/1997 | Be et al. |
| 5,712,044 A | 1/1998 | Fanselow et al. |
| 5,721,086 A | 2/1998 | Emslander et al. |
| 5,728,430 A | 3/1998 | Sartor et al. |
| 5,755,929 A | 5/1998 | Kuroyama et al. |
| 5,766,744 A | 6/1998 | Fanselow et al. |
| 5,783,303 A | 7/1998 | Tsuei |
| 5,798,123 A | 8/1998 | Cleckner et al. |
| 5,837,375 A | 11/1998 | Brault et al. |
| 5,849,419 A | 12/1998 | Josephy et al. |
| 5,853,899 A | 12/1998 | Anderson et al. |
| 5,856,010 A | 1/1999 | Furuya et al. |
| 5,866,248 A | 2/1999 | Dressier |
| 5,873,607 A | 2/1999 | Waggoner |
| 5,882,388 A | 3/1999 | Adair et al. |
| 5,888,615 A | 3/1999 | Mascarenhas et al. |
| 5,888,635 A | 3/1999 | Yang et al. |
| 5,902,673 A | 5/1999 | Missell et al. |
| 5,955,512 A | 9/1999 | Numazawa et al. |
| 5,981,045 A | 11/1999 | Kuwabara et al. |
| 6,001,916 A | 12/1999 | Walker et al. |
| 6,022,925 A | 2/2000 | Tomko et al. |
| 6,025,068 A | 2/2000 | Pekala |
| 6,031,041 A | 2/2000 | Chung et al. |
| 6,033,514 A | 3/2000 | Davis et al. |
| 6,040,035 A | 3/2000 | Satoh et al. |
| 6,045,648 A | 4/2000 | Palmgren et al. |
| 6,045,920 A | 4/2000 | Ou-Yang et al. |
| 6,063,858 A | 5/2000 | Daniels et al. |
| 6,074,747 A | 6/2000 | Scholz et al. |
| 6,077,648 A | 6/2000 | Nair et al. |
| 6,087,001 A | 7/2000 | Jacquemet et al. |
| 6,093,451 A | 7/2000 | Sandlin et al. |
| 6,096,425 A | 8/2000 | Smith |
| 6,106,982 A | 8/2000 | Mientus et al. |
| 6,110,570 A | 8/2000 | Paleari et al. |
| 6,114,021 A | 9/2000 | Pankratz et al. |
| 6,132,858 A | 10/2000 | Kloos |
| 6,143,408 A | 11/2000 | Fujita |
| 6,146,770 A | 11/2000 | Sargeant et al. |
| 6,150,013 A | 11/2000 | Balaji et al. |
| 6,152,115 A | 11/2000 | Busato et al. |
| 6,153,288 A | 11/2000 | Shih et al. |
| 6,156,403 A | 12/2000 | Cochran |
| 6,159,605 A | 12/2000 | Hanada et al. |
| 6,165,593 A | 12/2000 | Brault et al. |
| 6,171,681 B1 | 1/2001 | Mascarenhas et al. |
| 6,177,187 B1 | 1/2001 | Niemoller et al. |
| 6,194,061 B1 | 2/2001 | Satoh et al. |
| 6,207,361 B1 | 3/2001 | Greener et al. |
| 6,218,455 B1 | 4/2001 | Smith et al. |
| 6,225,381 B1 | 5/2001 | Sharma et al. |
| 6,228,486 B1 | 5/2001 | Kittel et al. |
| 6,239,209 B1 | 5/2001 | Yang et al. |
| 6,258,441 B1 | 7/2001 | Oguchi et al. |
| 6,258,918 B1 | 7/2001 | Ho et al. |
| 6,261,670 B1 | 7/2001 | Hakomori et al. |
| 6,270,912 B1 | 8/2001 | Peet |
| 6,280,027 B1 | 8/2001 | Lawrence et al. |
| 6,316,120 B1 | 11/2001 | Emslander |
| 6,329,060 B1 | 12/2001 | Barkac et al. |
| 6,355,345 B1 | 3/2002 | Furuya et al. |
| 6,358,660 B1 | 3/2002 | Agler et al. |
| 6,379,813 B1 | 4/2002 | Anderson et al. |
| 6,383,644 B2 | 5/2002 | Fuchs |
| 6,391,415 B1 | 5/2002 | McCurry et al. |
| 6,395,209 B2 | 5/2002 | Yoshida et al. |
| 6,403,202 B2 | 6/2002 | Gu et al. |
| 6,403,223 B1 * | 6/2002 | Albro .................... B32B 27/08 359/488.01 |
| 6,410,200 B1 | 6/2002 | Williams et al. |
| 6,428,895 B1 | 8/2002 | Reihs et al. |
| 6,436,496 B1 | 8/2002 | Rackovan et al. |
| 6,447,883 B1 | 9/2002 | Chen et al. |
| 6,451,908 B1 | 9/2002 | Koonce et al. |

(56) References Cited

U.S. PATENT DOCUMENTS

| | | |
|---|---|---|
| 6,461,706 B1 | 10/2002 | Freedman et al. |
| 6,461,722 B1 | 10/2002 | Kittel et al. |
| 6,495,628 B1 | 12/2002 | Origuchi et al. |
| 6,509,075 B1 | 1/2003 | McCurry et al. |
| 6,509,097 B1 | 1/2003 | Hatakeyama et al. |
| 6,521,325 B1 | 2/2003 | Engle et al. |
| 6,531,216 B1 | 3/2003 | Williams et al. |
| 6,541,101 B1 | 4/2003 | Cook et al. |
| 6,552,115 B1 | 4/2003 | Zecha et al. |
| 6,555,213 B1 | 4/2003 | Koneripalli et al. |
| 6,555,240 B1 | 4/2003 | Nishikori et al. |
| 6,566,024 B1 | 5/2003 | Bourdelais |
| 6,573,011 B1 | 6/2003 | Nair et al. |
| 6,589,636 B2 | 7/2003 | Emslander et al. |
| 6,592,700 B2 | 7/2003 | Wang et al. |
| 6,599,593 B1 | 7/2003 | Niu et al. |
| 6,617,008 B1 | 9/2003 | Kono et al. |
| 6,623,841 B1 | 9/2003 | Venkatasanthanam et al. |
| 6,630,049 B2 | 10/2003 | Hannington et al. |
| 6,632,485 B1 | 10/2003 | Tang et al. |
| 6,641,879 B1 | 11/2003 | Matsuura et al. |
| 6,649,260 B2 | 11/2003 | Kumano et al. |
| 6,663,947 B2 | 12/2003 | Freedman et al. |
| 6,667,093 B2 | 12/2003 | Yuan et al. |
| 6,673,453 B2 | 1/2004 | Beavers et al. |
| 6,713,166 B2 | 3/2004 | Yamamoto |
| 6,723,433 B2 | 4/2004 | Bacon, Jr. |
| 6,723,773 B2 | 4/2004 | Williams et al. |
| 6,726,969 B1 | 4/2004 | Balaji et al. |
| 6,726,981 B1 | 4/2004 | Steinbeck et al. |
| 6,740,465 B2 | 5/2004 | Liang et al. |
| 6,743,523 B1 | 6/2004 | Woo et al. |
| 6,755,350 B2 | 6/2004 | Rochford et al. |
| 6,759,121 B2 | 7/2004 | Alahapperuma et al. |
| 6,761,969 B2 | 7/2004 | Li et al. |
| 6,773,804 B2 | 8/2004 | Enlow et al. |
| 6,786,994 B2 | 9/2004 | Williams et al. |
| 6,790,491 B2 | 9/2004 | Sebastian et al. |
| 6,790,516 B2 | 9/2004 | Niepelt |
| 6,793,859 B2 | 9/2004 | Emslander et al. |
| 6,793,860 B2 | 9/2004 | Xing et al. |
| 6,794,466 B2 | 9/2004 | Zecha et al. |
| 6,800,341 B2 | 10/2004 | Emslander et al. |
| 6,808,822 B2 | 10/2004 | Rajan et al. |
| 6,811,857 B1 | 11/2004 | Bravet et al. |
| 6,821,583 B2 | 11/2004 | Shouldice et al. |
| 6,830,803 B2 | 12/2004 | Vaidya et al. |
| 6,841,204 B2 | 1/2005 | Nakamura et al. |
| 6,846,075 B2 | 1/2005 | Ylitalo et al. |
| 6,846,524 B2 | 1/2005 | Ozawa et al. |
| 6,857,737 B2 | 2/2005 | Emslander et al. |
| 6,866,383 B2 | 3/2005 | Naik et al. |
| 6,866,904 B2 | 3/2005 | Nellis et al. |
| 6,875,487 B1 | 4/2005 | Williams et al. |
| 6,881,458 B2 | 4/2005 | Ludwig et al. |
| 6,881,704 B2 | 4/2005 | Sakamoto et al. |
| 6,896,944 B2 | 5/2005 | Ylitalo et al. |
| 6,911,239 B2 | 6/2005 | King et al. |
| 6,919,113 B2 | 7/2005 | Therrian et al. |
| 6,953,624 B2 | 10/2005 | Bacon, Jr. |
| 6,969,483 B1 | 11/2005 | Woo et al. |
| 6,986,919 B2 | 1/2006 | Hladik et al. |
| 6,989,192 B2 | 1/2006 | Huseman et al. |
| 6,989,418 B2 | 1/2006 | Ko et al. |
| 6,989,715 B2 | 1/2006 | Yin |
| 7,014,910 B2 | 3/2006 | Rochford et al. |
| 7,022,385 B1 | 4/2006 | Nasser |
| 7,025,453 B2 | 4/2006 | Ylitalo et al. |
| 7,045,199 B2 | 5/2006 | Yamamoto et al. |
| 7,097,298 B2 | 8/2006 | Sondergeld et al. |
| 7,147,923 B2 | 12/2006 | Roberts et al. |
| 7,157,133 B2 | 1/2007 | Moran |
| 7,166,156 B2 | 1/2007 | Parrinello et al. |
| 7,166,649 B2 | 1/2007 | Day et al. |
| 7,179,521 B2 | 2/2007 | Arthurs et al. |
| 7,205,029 B2 | 4/2007 | Ohrbom et al. |
| 7,223,468 B2 | 5/2007 | Yamamoto et al. |
| 7,291,372 B2 | 11/2007 | Otsuki et al. |
| 7,326,462 B2 | 2/2008 | Ishiguro et al. |
| 7,332,205 B2 | 2/2008 | Hannington et al. |
| 7,344,618 B2 | 3/2008 | Hannington et al. |
| 7,358,295 B2 | 4/2008 | Miller et al. |
| 7,371,465 B2 | 5/2008 | Peilingra et al. |
| 7,384,672 B2 | 6/2008 | Chang et al. |
| 7,402,341 B2 | 7/2008 | Halahmi |
| 7,410,692 B2 | 8/2008 | Koda et al. |
| 7,476,705 B2 | 1/2009 | Pajerski |
| 7,534,479 B2 | 5/2009 | Utz |
| 7,569,272 B2 | 8/2009 | Ohrul et al. |
| 7,582,698 B2 | 9/2009 | Lubnin et al. |
| 7,588,812 B1 | 9/2009 | Patel et al. |
| 7,641,947 B2 | 1/2010 | Chen et al. |
| 7,655,296 B2 | 2/2010 | Haas et al. |
| 7,678,959 B2 | 3/2010 | Okada et al. |
| 7,691,784 B2 | 4/2010 | Yuki et al. |
| 7,691,948 B2 | 4/2010 | Takamatsu et al. |
| 7,700,188 B2 | 4/2010 | Balaji et al. |
| 7,799,851 B2 | 9/2010 | Hladik et al. |
| 7,872,069 B2 | 1/2011 | Xia et al. |
| 7,906,218 B2 | 3/2011 | Steichen et al. |
| 7,910,519 B2 | 3/2011 | Majumdar et al. |
| 7,935,398 B2 | 5/2011 | Park et al. |
| 7,951,457 B2 | 5/2011 | Casteren Van et al. |
| 7,968,183 B2 | 6/2011 | Takada et al. |
| 7,972,681 B2 | 7/2011 | Roys et al. |
| 8,002,938 B2 | 8/2011 | Elwakil et al. |
| 8,003,176 B2 | 8/2011 | Ylitalo et al. |
| 8,088,847 B2 | 1/2012 | Numrich et al. |
| 8,114,485 B1 | 2/2012 | Schwendimann et al. |
| 8,796,351 B2 | 8/2014 | Koch |
| 9,240,131 B2 | 1/2016 | Onderisin et al. |
| 9,636,938 B2 | 5/2017 | Owusu et al. |
| 2001/0051265 A1 | 12/2001 | Williams et al. |
| 2002/0009576 A1 | 1/2002 | Fu et al. |
| 2002/0011306 A1 | 1/2002 | Mannington et al. |
| 2002/0039642 A1 | 4/2002 | Inoue et al. |
| 2002/0098327 A1 | 7/2002 | Ohta et al. |
| 2002/0146544 A1 | 10/2002 | Kronzer |
| 2002/0164455 A1 | 11/2002 | Nishikawa et al. |
| 2002/0177669 A1 | 11/2002 | Jenny et al. |
| 2003/0031820 A1 | 2/2003 | Nagamoto et al. |
| 2003/0049415 A1 | 3/2003 | Pedginski et al. |
| 2003/0050379 A1 | 3/2003 | Shih et al. |
| 2003/0060574 A1 | 3/2003 | Muller et al. |
| 2003/0096087 A1 | 5/2003 | Benanati et al. |
| 2003/0099827 A1 | 5/2003 | Shih et al. |
| 2003/0121600 A1 | 7/2003 | Loncar, Jr. et al. |
| 2003/0157276 A1 | 8/2003 | Romano, Jr. |
| 2003/0170405 A1 | 9/2003 | Parrinello et al. |
| 2003/0180541 A1 | 9/2003 | Naik et al. |
| 2003/0207051 A1 | 11/2003 | Kozumi |
| 2004/0001135 A1 | 1/2004 | Soga |
| 2004/0048073 A1 | 3/2004 | Bacon, Jr. |
| 2004/0058133 A1 | 3/2004 | Bilodeau |
| 2004/0063826 A1 | 4/2004 | Sobieski et al. |
| 2004/0076804 A1 | 4/2004 | Kijima et al. |
| 2004/0091645 A1 | 5/2004 | Heederik et al. |
| 2004/0105940 A1 | 6/2004 | Parrinello et al. |
| 2004/0105971 A1 | 6/2004 | Parrinello et al. |
| 2004/0105994 A1 | 6/2004 | Lu et al. |
| 2004/0197572 A1 | 10/2004 | Bell |
| 2004/0202840 A1 | 10/2004 | Do et al. |
| 2004/0241352 A1 | 12/2004 | Shih et al. |
| 2005/0003112 A1 | 1/2005 | Chen |
| 2005/0008794 A1 | 1/2005 | Graczyk et al. |
| 2005/0019508 A1 | 1/2005 | Engel et al. |
| 2005/0048303 A1 | 3/2005 | Henderson et al. |
| 2005/0074601 A1 | 4/2005 | Onishi |
| 2005/0084788 A1 | 4/2005 | Yau et al. |
| 2005/0100687 A1 | 5/2005 | Dutton et al. |
| 2005/0136263 A1 | 6/2005 | Roberts et al. |
| 2005/0147807 A1 | 7/2005 | Haas et al. |
| 2005/0196607 A1 | 9/2005 | Shih et al. |
| 2005/0234175 A1 | 10/2005 | Ko et al. |

(56) References Cited

U.S. PATENT DOCUMENTS

| | | |
|---|---|---|
| 2005/0244657 A1 | 11/2005 | Kawamura et al. |
| 2006/0001725 A1 | 1/2006 | Nagata et al. |
| 2006/0014022 A1 | 1/2006 | Kendig et al. |
| 2006/0019073 A1 | 1/2006 | Kinley et al. |
| 2006/0160949 A1 | 7/2006 | Styranec et al. |
| 2006/0204689 A1 | 9/2006 | Tsukamoto et al. |
| 2006/0234075 A1 | 10/2006 | Watanabe |
| 2006/0263564 A1 | 11/2006 | Steyaert |
| 2006/0292317 A1 | 12/2006 | Parrinello et al. |
| 2007/0048466 A1 | 3/2007 | Huynh |
| 2007/0077421 A1 | 4/2007 | Grefenstein et al. |
| 2007/0125490 A1 | 6/2007 | Elwakil et al. |
| 2007/0136973 A1 | 6/2007 | Patel et al. |
| 2007/0148444 A1 | 6/2007 | Kamiya et al. |
| 2007/0172608 A1 | 7/2007 | Tojo et al. |
| 2007/0172609 A1 | 7/2007 | Williams |
| 2007/0172636 A1 | 7/2007 | Smith et al. |
| 2007/0196647 A1 | 8/2007 | Yokohama et al. |
| 2008/0026182 A1 | 1/2008 | Abe et al. |
| 2008/0057251 A1 | 3/2008 | Griswold et al. |
| 2008/0085385 A1 | 4/2008 | Ylitalo et al. |
| 2008/0166507 A1 | 7/2008 | Park et al. |
| 2008/0199704 A1 | 8/2008 | Ho et al. |
| 2008/0280111 A1 | 11/2008 | Blackwell et al. |
| 2008/0286576 A1 | 11/2008 | McGuire, Jr. et al. |
| 2008/0302470 A1 | 12/2008 | Sumita et al. |
| 2009/0017299 A1 | 1/2009 | Shimbo et al. |
| 2009/0047449 A1 | 2/2009 | Snow |
| 2009/0214837 A1 | 8/2009 | Aibenice et al. |
| 2009/0233067 A1 | 9/2009 | Doornheim et al. |
| 2009/0269568 A1 | 10/2009 | Kuhlmann et al. |
| 2009/0286033 A1 | 11/2009 | Taghavi et al. |
| 2009/0297820 A1 | 12/2009 | Kovalchuk et al. |
| 2009/0317572 A1 | 12/2009 | Abe et al. |
| 2010/0009108 A1 | 1/2010 | Shih |
| 2010/0048077 A1 | 2/2010 | Ko et al. |
| 2010/0051200 A1 | 3/2010 | Mueller et al. |
| 2010/0058656 A1 | 3/2010 | Chevalier et al. |
| 2010/0065212 A1 | 3/2010 | Husemann et al. |
| 2010/0104872 A1 | 4/2010 | Lu |
| 2010/0112263 A1 | 5/2010 | Lorence et al. |
| 2010/0143615 A1 | 6/2010 | Hsu |
| 2010/0215880 A1 | 8/2010 | Chu |
| 2010/0243151 A1 | 9/2010 | Stokes |
| 2011/0009561 A1 | 1/2011 | Pajerski et al. |
| 2011/0012974 A1 | 1/2011 | Niu |
| 2011/0027505 A1 | 2/2011 | Majumdar et al. |
| 2011/0033698 A1 | 2/2011 | Woods et al. |
| 2011/0033700 A1 | 2/2011 | Caylus |
| 2011/0045290 A1 | 2/2011 | Maeda et al. |
| 2011/0052843 A1 | 3/2011 | Dontula et al. |
| 2011/0064900 A1 | 3/2011 | Uesugi et al. |
| 2011/0064953 A1 | 3/2011 | O'Rourke et al. |
| 2011/0064956 A1 | 3/2011 | Casteren Van et al. |
| 2011/0077345 A1 | 3/2011 | Erdem et al. |
| 2011/0104488 A1 | 5/2011 | Mussig et al. |
| 2011/0111146 A1 | 5/2011 | Williams |
| 2011/0117296 A1 | 5/2011 | Jang et al. |
| 2011/0117299 A1 | 5/2011 | Kung et al. |
| 2011/0152439 A1 | 6/2011 | Wu et al. |
| 2011/0200830 A1 | 8/2011 | Tennebroek et al. |
| 2011/0250368 A1 | 10/2011 | Shih et al. |
| 2012/0000591 A1 | 1/2012 | Mussig et al. |
| 2012/0088054 A1 | 4/2012 | Shih et al. |
| 2014/0242316 A1 | 8/2014 | Shih et al. |
| 2015/0184037 A1 | 7/2015 | Owusu et al. |
| 2017/0203598 A1 | 7/2017 | Owusu et al. |

FOREIGN PATENT DOCUMENTS

| | | |
|---|---|---|
| CN | 1553853 | 12/2004 |
| CN | 100381530 | 4/2008 |
| CN | 101368073 | 2/2009 |
| CN | 100493670 | 4/2009 |
| CN | 100569884 | 12/2009 |
| CN | 101619200 | 1/2010 |
| CN | 100592110 | 2/2010 |
| CN | 101812277 | 8/2010 |
| CN | 101864258 | 10/2010 |
| CN | 101434819 | 11/2010 |
| CN | 101544725 | 12/2010 |
| CN | 101497680 | 2/2011 |
| CN | 102190988 | 9/2011 |
| CN | 102190990 | 9/2011 |
| CN | 102190992 | 9/2011 |
| CN | 102250566 | 11/2011 |
| CN | 102268233 | 12/2011 |
| CN | 101717468 | 1/2012 |
| CN | 101362815 | 2/2012 |
| CN | 102382605 | 3/2012 |
| CN | 101717612 | 5/2012 |
| CN | 101974299 | 7/2012 |
| CN | 102226068 | 7/2012 |
| CN | 102020956 | 9/2012 |
| CN | 102070741 | 1/2013 |
| CN | 102206476 | 3/2013 |
| CN | 102344522 | 7/2013 |
| CN | 101591511 | 8/2015 |
| CN | 102869501 | 5/2016 |
| DE | 4114085 | 11/1992 |
| DE | 102005029722 | 12/2006 |
| DE | 102005041134 | 3/2007 |
| DE | 102009005517 | 7/2010 |
| EP | 0355982 | 2/1990 |
| EP | 0359532 | 3/1990 |
| EP | 0275755 | 11/1990 |
| EP | 0538173 | 4/1993 |
| EP | 0547834 | 6/1993 |
| EP | 0696516 | 2/1996 |
| EP | 0899130 A2 | 3/1999 |
| EP | 0929602 | 7/1999 |
| EP | 0976580 A1 | 2/2000 |
| EP | 1026215 | 8/2000 |
| EP | 1125169 | 8/2001 |
| EP | 1180436 | 2/2002 |
| EP | 1260566 | 11/2002 |
| EP | 0997314 | 12/2002 |
| EP | 1135815 | 7/2003 |
| EP | 0963857 | 2/2004 |
| EP | 0933226 | 3/2004 |
| EP | 1520690 | 4/2005 |
| EP | 1059379 | 2/2006 |
| EP | 1705219 | 9/2006 |
| EP | 1364800 | 3/2007 |
| EP | 1767341 | 3/2007 |
| EP | 1777243 | 5/2011 |
| EP | 1114734 | 7/2011 |
| EP | 1908798 | 8/2013 |
| JP | 60-253544 | 12/1985 |
| JP | 4-285650 | 10/1992 |
| JP | 52-14181 | 8/1993 |
| JP | 7179831 | 7/1995 |
| JP | 08-99458 | 4/1996 |
| JP | 9-503168 | 3/1997 |
| JP | 10006654 | 1/1998 |
| JP | 10-110032 | 4/1998 |
| JP | 10235815 | 9/1998 |
| JP | 10-264500 | 10/1998 |
| JP | 10305533 | 11/1998 |
| JP | 10305534 | 11/1998 |
| JP | 11198555 | 7/1999 |
| JP | 11202536 | 7/1999 |
| JP | 11315257 | 11/1999 |
| JP | 2000-071607 | 3/2000 |
| JP | 2000168018 | 6/2000 |
| JP | 2000-185459 | 7/2000 |
| JP | 2000-309160 | 11/2000 |
| JP | 2000-326622 | 11/2000 |
| JP | 2000-336327 | 12/2000 |
| JP | 2001-071631 | 3/2001 |
| JP | 2002-322359 | 11/2002 |
| JP | 2003-002923 | 1/2003 |
| JP | 2003-096140 | 4/2003 |
| JP | 2003-154612 | 5/2003 |

(56) References Cited

FOREIGN PATENT DOCUMENTS

| | | |
|---|---|---|
| JP | 2003-154748 | 5/2003 |
| JP | 2003-220670 | 8/2003 |
| JP | 2003-231226 | 8/2003 |
| JP | 2003-276133 | 9/2003 |
| JP | 2004-010661 | 1/2004 |
| JP | 2004-010662 | 1/2004 |
| JP | 2004-083787 | 3/2004 |
| JP | 2004-090380 | 3/2004 |
| JP | 2004-223811 | 8/2004 |
| JP | 2004-331899 | 11/2004 |
| JP | 2005-070686 | 3/2005 |
| JP | 2005-131930 | 5/2005 |
| JP | 2005-132032 | 5/2005 |
| JP | 2005-238694 | 9/2005 |
| JP | 2006-021354 | 1/2006 |
| JP | 2006-052298 | 2/2006 |
| JP | 2006-088349 | 4/2006 |
| JP | 2006-150653 | 6/2006 |
| JP | 2006-274220 | 10/2006 |
| JP | 2006-346885 | 12/2006 |
| JP | 2007-037900 | 2/2007 |
| JP | 2007-038677 | 2/2007 |
| JP | 2007-050620 | 3/2007 |
| JP | 2007-111867 | 5/2007 |
| JP | 2007-118584 | 5/2007 |
| JP | 2007-160746 | 6/2007 |
| JP | 2007-237438 | 9/2007 |
| JP | 2007-296827 | 11/2007 |
| JP | 2007-297569 | 11/2007 |
| JP | 2008-012716 | 1/2008 |
| JP | 2008-062611 | 3/2008 |
| JP | 2008-073871 | 4/2008 |
| JP | 2008087173 | 4/2008 |
| JP | 2008-105356 | 5/2008 |
| JP | 2008-221689 | 9/2008 |
| JP | 2008-238481 | 10/2008 |
| JP | 2009-120663 | 6/2009 |
| JP | 2009-172888 | 8/2009 |
| JP | 2010-069687 | 4/2010 |
| JP | 2010-076183 | 4/2010 |
| JP | 2010-094813 | 4/2010 |
| JP | 2010-094974 | 4/2010 |
| JP | 2010-229291 | 10/2010 |
| JP | 2010-253704 | 11/2010 |
| JP | 2010-253759 | 11/2010 |
| JP | 2010-253892 | 11/2010 |
| JP | 2010-269583 | 12/2010 |
| JP | 2011-021134 | 2/2011 |
| JP | 2011-032355 | 2/2011 |
| JP | 2011-051303 | 3/2011 |
| WO | 92/14768 | 9/1992 |
| WO | 95/04655 | 2/1995 |
| WO | 98/04418 | 2/1998 |
| WO | 99/28791 | 6/1999 |
| WO | 00/13887 | 3/2000 |
| WO | 00/13888 | 5/2001 |
| WO | 02/31016 | 4/2002 |
| WO | 02/36353 | 5/2002 |
| WO | 02/48260 | 6/2002 |
| WO | 02/062894 | 8/2002 |
| WO | 03/016045 | 2/2003 |
| WO | 03/037614 | 5/2003 |
| WO | 03/080356 | 10/2003 |
| WO | 2003/093357 | 11/2003 |
| WO | 2004/003060 | 1/2004 |
| WO | 2004/003093 | 1/2004 |
| WO | 2004/060641 | 7/2004 |
| WO | 2004/060686 | 7/2004 |
| WO | 2004/060687 | 7/2004 |
| WO | 2005/068195 | 7/2005 |
| WO | 2010/005452 | 1/2010 |
| WO | 2010/062438 | 6/2010 |
| WO | 2010/091346 | 8/2010 |
| WO | 2010/129299 | 11/2010 |
| WO | 2011/037732 | 3/2011 |
| WO | 2011/109692 | 9/2011 |
| WO | 2011/146188 | 11/2011 |
| WO | 2011/091132 | 12/2011 |
| WO | 2013/033067 | 3/2013 |

OTHER PUBLICATIONS

Derwent Abstract for JP H10-110032 dated Apr. 28, 1998.
International Search Report and Written Opinion dated Oct. 24, 2012 issued in corresponding international Application No. PCT/US2012/052616.
International Preliminary Report on Patentability dated Mar. 13, 2014 issued in corresponding International Application No. PCT/US2012/052616.
Invitation to Pay Additional Fees and Partial international Search Report issued in PCT/US08/069706 dated Oct. 30, 2008.
SAE Technical Standard J1960 (Rev. Oct. 2004).
Griffin, G.J.L, "Biodegradation of ethylene/vinylacetate copolymers," Proceedings of 3rd international Biodegredation Symposium, pp. 807-813, 1975.
International Search Report and the Written Opinion of the International Searching Authority issued in PCT/US08/069706 dated Feb. 19, 2009.
Invitation to Pay Additional Fees and Partial International Search Report issued in PCT/US2008/084812 dated Mar. 20, 2009.
International Search Report and Written Opinion issued in corresponding PCT/US2008/084812 dated May 19, 2009.
International Search Report and Written Opinion dated Jul. 21, 2011 issued in corresponding International Application No. PCT/US2011/027154 filed Mar. 4, 2011.
International Preliminary Report on Patentability dated Nov. 4, 2012 issued in corresponding International Application No. PCT/US2011/027154 filed Mar. 4, 2011.
"Evaluation of the Residual Stability of Polyurethane Automotive Coatings by DSC," P. Simon et al., Journal of Thermal Analysis an Calorimety, vol. 84 (2006) 3, 679-692.
International Search Report dated Apr. 16, 2015 issued in corresponding International Application No. PCT/US2014/070259.
Written Opinion dated Apr. 16, 2015 issued in corresponding International Application No. PCT/US2014/070259.
International Preliminary Report on Patentability dated Jul. 14, 2016 issued in corresponding International Application No. PCT/US2014/070259.
International Search Report and Written Opinion dated Apr. 17, 2013 issued in corresponding International Application No. PCT/US2013/021 205 filed Jan. 11, 2013.
International Preliminary Report on Patentability dated Jul. 24, 2014 issued in corresponding International Application No. PCT/US2013/021205 filed Jan. 11, 2013.
"ASTM D1238 Standard Test Method for Melt Flow Rates of Thermoplastics by Extrusion Plastometer," ASTM D1238, Jan. 1, 2013, pp. 284-299, XP009195312.
National Application 3688-2006 (ROEHM GMBH) Dec. 22, 2006 as cited in an Office Action dated Apr. 20, 2018 for Chilean App. No. 201601603.
Press release "Air Products Introduces Hybrid Waterborne Resins at ICE," published on Nov. 14, 2003, downloaded from https://coatings.specialchem.com.
Notice of Opposition filed by Eun-Suk Choi in corresponding EP2542409, dated Sep. 24, 2019, 29 pages.
"Hybridur(R) 870 and 878 Polymer Binders are New Cost-Effective Waterborne Resin Technologies with Chemical Resistance of a PUT—and are NMP-free," Press Release from Air Products and Chemicals, Inc., Nov. 12, 2003, 1 page.
"JONCRYL(R) 617, an acrylic polymer emulsion for use i water-based inks and oerprint varnishes," BASF Resins BV, Jan. 1, 2007, 4 pages.
"Hybridur(R) 870 Polymer Dispersion," Evonik Corporation, Jun. 2017, 6 pages.
Standard Test Method for Tensile Properties of Thin Plastic Sheeting, D882-10, Aug. 6, 2020, 10 pages.
"Industrial Coatings, raw material selection guide," BASF Corporation, 2014, 56 pages.

(56) References Cited

OTHER PUBLICATIONS

"Printing and Packaging, resins, performance and formulation additives selection guide for packaging solutions," BASF Corporation, 2017, 36 pages.

"Benefits, built on eachother—The BASF resins and additives portfolio for printing and packaging," BASF SE, date unknown, 32 pages.

* cited by examiner

POLYURETHANE PROTECTIVE FILM

CROSS-REFERENCE TO RELATED APPLICATION

The present application claims the benefit of U.S. Provisional Application No. 61/921,600 filed Dec. 30, 2013, which is incorporated herein by reference in its entirety.

FIELD

The present subject matter is in the field of non-polyvinyl chloride (PVC) films and non-PVC film laminates for use with small format, and large format graphic films and presentations, advertising media, promotional media, static visual communications, vehicle and product wraps and other commercial applications. The film may be clear, transparent, translucent, or have other desirable optical properties.

BACKGROUND

Polyvinyl chloride films have been used widely in a number of promotional and advertising campaigns, such as outdoor graphics applications in the past. Such applications include signs, banners, fleet marketing graphics, architectural and wall covering, consumer product labeling and other pressure sensitive products. However, there is an increasing awareness on the environmental and health impacts and effects of using PVC based products, which has increased significantly in recent years. Currently, there is a movement to reduce or even eliminate PVC-based products from the consumer marketing, promotional and advertising product streams.

Films for outdoor marketing and graphics applications ideally should have at least some of the following properties: printability, durability, color retention, and scratch resistance. Conformability and proper mechanical properties such as tensile elongation and tensile strength are also important for certain applications. A film with the correct conformability is a film which has sufficient elongation and flexibility to follow the film follow the contour of the subject or surface to which it is applied, preventing the creation of bubbles or gaps between the subject or surface, and the film. A non-conformable film, i.e. a film which does not have sufficient elongation or flexibility may not follow the contour of the subject or surface, creating bubbles or gaps between the surface and the film. Insufficient elongation properties may make the film hard to apply over a surface, e.g. those surfaces that have curves, angles, ridges and other non-planar configurations, but too much elongation may deform the film and potentially causing a distortion of the printed indicia. Sufficient elongation properties make the film easy to apply over those surfaces that have curves, angles, ridges and other non-planar configurations, while sufficiently maintaining the film such as to prevent a distortion of the printed indicia. Films with correct tensile strength prevent easy breakage of the film when being stretched, such as when the film is being applied to a non-planar surface. Films with a low tensile strength may cause the film to break easily when being stretched.

As new PVC replacement films are being developed, some of the films have superior performance in one area, such as printability, but lack adequate functionality with respect to the other properties such as the outdoor durability to make the films acceptable for the demanding advertising and promotional market. One possible way to resolve the foregoing problem is to use a multi-layer film laminate with each layer providing one or more of the desired properties so that the laminate has all the desired properties that are needed.

When used as the outermost protective layer in a film laminate, or simply used as a protective film for a given surface, good outdoor durability and in many cases optical transparency is also required so the indicia on an underneath printable layer can be visible.

Therefore, there is a need for non-PVC-based transparent films and non-PVC film laminates for use with outdoor graphics and other marketing and consumer use applications.

SUMMARY

The embodiments of the present subject matter described below are not intended to be exhaustive or to limit the subject matter to the precise forms disclosed in the following detailed description. Rather, the embodiments are chosen and described so that others skilled in the art may appreciate and understand the principles and practices of the present subject matter.

The subject matter is directed to a non-PVC based film product having similar properties to those of conventional PVC offerings that is suitable for use in connection with marketing promotions, graphics, branding campaigns and other printed or imaged communication based initiatives.

In one exemplary embodiment of the presently described subject matter, a film, which may be clear, transparent, translucent or have other desirable optical properties, is made of at least two different polyurethane polymers, and is substantially free of PVC.

In another exemplary embodiment of the presently described subject matter, an optically transparent protective film comprises at least two different polyurethanes and is substantially free of polyvinyl chloride based polymer. Each of the at least two different polyurethanes comprise at least one of polyurethane polymer, polyurethane prepolymer, and polyurethane copolymer.

In another exemplary embodiment of the presently described subject matter, a film laminate includes a top layer, an intermediate layer, and a substrate layer. The top layer is a film comprising at least two different polyurethanes and is substantially free of polyvinyl chloride based polymer. Each of the at least two different polyurethanes comprise at least one of polyurethane polymer, polyurethane prepolymer, and polyurethane copolymer. The substrate layer has printed or image indicia thereon.

In another exemplary embodiment of the presently described subject matter, an advertising or informational graphic includes a surface, a film, and an adhesive layer. The surface has promotional indicia provided thereon. The film has front and back faces, the back face being attached to the surface. The adhesive layer is disposed between the back face of the film and the surface and attaches the back face of the film to the surface. The film comprises at least two different polyurethanes and is substantially free of polyvinyl chloride based polymer. Each of the at least two different polyurethanes comprise at least one of polyurethane polymer, polyurethane prepolymer, and polyurethane copolymer.

In another exemplary embodiment of the presently described subject matter, an advertising or informational graphic includes a surface, an adhesive layer, a printable substrate, and a transparent film. The printable substrate has front and back faces. The back face of the printable substrate faces the surface and is in contact with the adhesive layer. The front face of the substrate has promotional indicia provided thereon. The transparent film has a top face and a bottom face, wherein the bottom face is facing the front face of the printable substrate. The film comprises at least two different polyurethanes, and is substantially free of polyvinyl chloride based polymer. Each of the at least two different polyurethanes comprise at least one of polyurethane polymer, polyurethane prepolymer, and polyurethane copolymer.

In another exemplary embodiment of the presently described subject matter, a roll or sheet of graphic advertising includes a film layer and advertising indicia. The film layer includes a first polyurethane and a second polyurethane and is substantially free of polyvinyl chloride based polymer. The first polyurethane has an ultimate elongation less than 200%. The second polyurethane has an ultimate elongation more than 400%. Each of the first polyurethane and the second polyurethane comprise at least one of polyurethane polymer, polyurethane prepolymer, and polyurethane copolymer. The film layer is provided in operative association with advertising indicia.

In another exemplary embodiment of the presently described subject matter, a method of making a protective film includes providing a first polyurethane dispersion that when dried and crosslinked, produces a first polyurethane having an ultimate elongation of less than 200% and is substantially free of polyvinyl chloride based polymer. The method also includes providing a second polyurethane dispersion that when dried and crosslinked, produces a second polyurethane having an ultimate elongation of greater than 400% and is substantially free of polyvinyl chloride based polymer. The method includes mixing the first polyurethane dispersion with the second polyurethane dispersion to form a film composition. The method includes adding one or more additives to the film composition. The additives comprise one or more selected from the group consisting of UV stabilizing agents, free-radical scavengers, cross-linking agents, thickeners, flow and leveling agents, rheology modifiers, surfactants, defoamers, dispersants, wetting agents, dyes, pigments, co-solvents, slip agents, water, isopropyl alcohol, and combinations thereof. The method includes applying the film composition to a surface, and drying the film composition to form the protective film.

In a further exemplary embodiment of the presently described subject matter, a method of protecting an advertising substrate that is subject to degradation from exposure to an outdoor environment includes providing a transparent protective film. The film comprises a first polyurethane having an ultimate elongation of less than 200%, and a second polyurethane having an ultimate elongation of more than 400%. The film is substantially free of polyvinyl chloride based polymer. The method includes covering the advertising substrate with the film to thereby protect the advertising substrate from exposure to the outdoor environment.

Other features and advantages of the present subject matter will become apparent to those skilled in the art from the following detailed description. It is to be understood, however, that the detailed description of the various embodiments and specific examples, while indicating various embodiments of the present subject matter, are given by way of illustration and not limitation. Many changes and modifications within the scope of the present subject matter may be made without departing from the spirit thereof, and the subject matter includes all such modifications.

BRIEF DESCRIPTION OF THE DRAWINGS

These, as well as other objects and advantages of this subject matter, will be more completely understood and appreciated by referring to the following more detailed description of the present exemplary embodiments of the subject matter in conjunction with the accompanying drawings, of which.

Unless otherwise indicated, the illustrations in the above figures are not necessarily drawn to scale.

DETAILED DESCRIPTION OF THE EMBODIMENTS

The apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to FIGURES.

The present subject matter relates to a film and a film laminate used for outdoor graphics applications, advertising, promotions and other marketing campaigns. More particularly, the present subject matter relates to a non-PVC transparent film and non-PVC film laminate for use in such applications. The film and film laminate provide suitable outdoor durability, scratch resistance, gloss, conformability, tensile elongation and tensile strength. Although many applications of the various films are described as outdoor applications, it will be appreciated that the present subject matter is not limited to outdoor applications. Instead, the films and related aspects of the present subject matter have wide applicability and include indoor applications for example.

In one exemplary embodiment of the subject matter, a transparent film with properties suitable for use in the outdoor graphics applications comprises at least two different polyurethane polymers and is substantially free of PVC based polymer. The term "PVC based polymer" or variations thereof refers to polyvinyl chloride polymers or polymers containing majority weight proportions of PVC.

As used herein the term "graphic" or "graphics" refers to a visually perceptible presentation on some surface that is intended to brand, illustrate, entertain, inform, advertise, announce, and/or market a product, service, event, or the like.

In one embodiment, the film comprises at least two different polyurethane polymers, prepolymers, or co-polymers. In one aspect, the film is made of two polyurethane polymers. One polyurethane has an ultimate elongation of less than 200%. The other polyurethane has an ultimate elongation more than 400%. The two different polyurethanes are combined in amounts or at a weight ratio so that the resulting dried film has an ultimate elongation of greater than 200%. In one aspect, the ultimate elongation of the resulting film is between 200% and 400%. In another aspect, the ultimate elongation of the resulting film is between 250% and 350%. In another aspect, the ultimate elongation of the resulting film is between 200% and 300%.

Using two different polyurethanes allows properties of the film to be specifically tailored for a particular purpose, while not being limited to the properties of a single polyurethane polymer. Using two different polyurethane polymers to produce a film having an ultimate elongation of greater than 200%, allows the characteristics of a film to be tailored in order to provide adequate protection for various intended uses and for substrates of various shapes. Further, properties of films of the present subject matter can be controlled by using specific polyurethane polymers at specific ratios, so as to provide an appropriate balance of different mechanical properties; for example between elasticity and tensile strength.

Typical films having an ultimate elongation between 200% and 400% and formed from a single polyurethane, are too elastic for use as a conformable protective film. In other words, the elasticity of these typical films allows the films to stretch or otherwise change shape when forces are applied thereto. However, these typical films, because they are too elastic, have a tendency to return to their original shape and/or size when the forces are removed. In the case where these typical films are used as protective layer over a substrate in a single or multi-layer film, these typical films tend to peel away from the substrate and/or other layers in a multi-layer film (including where an adhesive layer may be exposed), and fail to offer adequate protection to the substrate. In contrast, the films of the present subject matter can be tailored so that they are not too elastic, and therefore do not tend to pull away from a substrate or other layers in a multi-layer film. In this regard, the present subject matter films, once stretched over a substrate, substantially retain their stretched shape and size so that they offer adequate protection to a substrate.

In one aspect, a film composition is formed by combining a first polyurethane with a different, second polyurethane. The first polyurethane has an ultimate elongation of less than 200% and the second polyurethane has an ultimate elongation of more than 400%. The two polyurethane polymers are combined at a weight ratio from about 20:80 to about 80:20 of the first polyurethane to the second polyurethane. The film composition produces a film having an ultimate elongation of between 200% and 400%.

Various additives as discussed herein, can be added to the film composition. When dried, the film composition forms a transparent film. In one embodiment, the two polyurethanes are included from about 70 weight percent (wt %) to about 99 wt % of the film composition. In another embodiment, the two polyurethanes are included from about 92 wt % to about 97 wt % of the film composition.

In one embodiment, the film composition used to form the film of the present subject matter, has a thickness before drying from about 3.0 mils (76.2 microns) to about 4.5 mils (114.3 microns). In another aspect, the thickness of the film composition before drying is from about 3.3 mils (83.82 microns) to about 4.0 mils (101.6 microns).

Figure 1:
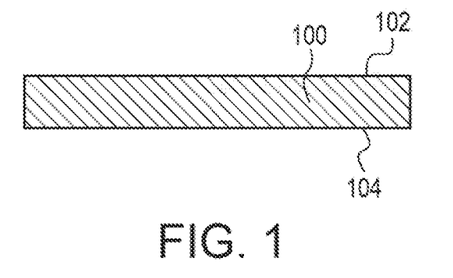
FIG. 1 is a sectional illustration of one exemplary embodiment of a film according to the present subject matter.

After drying, a film is formed having a thickness from about 0.3 mils (7.6 microns) to about 2.0 mils (50.8 microns), in another aspect from about 0.5 mil (12.7 microns) to about 1.5 mils (38.1 microns), and in another aspect from about 0.9 mils (22.9 microns) to about 1.2 mils (30.5 microns). Such film layer can be made from emulsion polymers, solvent polymers, or extruded polymers. When the thickness of the film 100 is too thin, the chemical resistance, scratch resistance and outdoor durability of the film may suffer. When the film is too thick, the thickness of the construction may also impact the conformability of the film.

Reference is now directed to the FIGURES in which FIG. 1 provides a sectional view of an exemplary film prepared in accordance with the presently described subject matter. The film 100 may be a single or multi-layer film. The film may be transparent, translucent, clear or have other desirable optical properties. The film 100 has a top face 102 and a bottom face 104. In one exemplary embodiment, the film 100 comprises a polyurethane polymer including at least two different polyurethane polymers. The film 100 is substantially free of PVC based polymer.

In addition, the film layers may have at least one additive added thereto. If an intermediate layer is included (see FIG. 3), such as an adhesive layer, the additive may also be present in the intermediate layer. The additives are selected from a group including UV stabilizing agents, free-radical scavengers, cross-linking agents, thickeners, flow and leveling agents, rheology modifiers, surfactants, defoamers, dispersants, wetting agents, dyes, pigments, slip agents, co-solvents, water, isopropyl alcohol, or combinations thereof. In one embodiment, the total amount of additives included in the film compositions of the present subject matter is from about 1 wt % to about 30 wt %. In another aspect, the total amount of additives is from about 3 wt % to about 8 wt % of the film composition.

In one embodiment, the polyurethane polymer of the film 100 is a combination of at least two different polyurethane polymers mixed at the molecular level. One polyurethane has ultimate elongation less than 200%, and the other polyurethane has ultimate elongation more than 400%. In one embodiment and in order to be environmentally friendly, the film 100 is created from waterborne dispersions, although other methods for producing the polyurethane polymer may also be used. Typically, there are two methods to make such mixed polymer dispersions. In a first method, a dispersion is formed from the two polyurethanes. In a second method, two polyurethane prepolymers are formed and added together. Polymerization is completed concurrently for the two polyurethane polymers. In one embodiment the two polyurethane dispersions are combined at a weight ratio of about 80:20 to about 20:80 of the first polyurethane dispersion to the second polyurethane dispersion.

The two polyurethane polymer dispersions prepared according to the above described methods have been found to show better mechanical properties when compared to a single polyurethane polymer due to the molecular level mixing which occurs through use of the foregoing processes. In one embodiment, in order to make the formulation even more environmentally friendly, that is to reduce the environmental impact over other preparations, the polyurethane polymer dispersions are further improved to be free of N-methylpyrrolidone (NMP), a component typically used as a processing solvent in other applications. Suitable polyurethane dispersions include but are not limited to Bondthane UD-104, Bondthane UD-255, Bondthane UD-275, and Bondthane UD-312 from Bond Polymers International, Seabrook N.H.; Neorez R-966, Neorez R-2180, Neorez R-2190 from DSM, Heerlen, the Netherlands; and Sancure 2710, Sancure 2715, Sancure 20041, Sancure 20025F from Lubrizol, Wickliffe Ohio.

Suitable polyurethane polymer dispersions for use in the compositions of the present subject matter, are those with aliphatic polyurethane components. As the film products produced can be used in an outdoor environment, the films may be exposed to moisture, such as dew, rain or snow; temperature deviations; light and other conditions which may impact the film performance. For example, moisture may cause components of the film or images thereon to bleach out or fade, and the film itself to whiten. Therefore, the polyurethane polymer structure is designed in order for this film to resist degradation when exposed to such conditions. The polyurethane polymer structures are selected so as to achieve the required tensile properties, block resistance, scratch resistance, transparency, and gloss. For example, the selection and ratio of the two polyurethane polymers controls the tensile properties of the film.

In another embodiment, the polyurethane film dispersions further include a polymer, a copolymer, prepolymers, or polymer blends selected from acrylic, styrene acrylic, vinyl acetate, olefin, and combinations thereof. Suitable polymers included in the polyurethane dispersions comprise, without limitation, acrylic polymers, styrene acrylic polymers, vinyl acetate ethylene copolymers, and polyolefins. Examples of suitable emulsion polymers include, without limitation, JONCRYL 617A JONCRYL 1987, JONCRYL 98, JONCRYL FLX5000, ACRONAL NX4612X and ACRONAL OPTIVE 410 available from BASF, Ludwigshafen, Germany; and VINNAPAS EF 811 from Wacker Chemicals, Munich, Germany or combinations thereof.

In one embodiment, the polyurethane polymer dispersions are crosslinked using a crosslinking agent to form a thermoset elastomer film upon drying. In the present subject matter, the molecular weight of the polyurethane polymer in the films is not particularly critical. In one embodiment, the number average molecular weight of the polyurethane polymer in the protective films upon crosslinking, ranges from about 50,000 to about 100,000.

UV blocking agents and free radical scavengers can be added to the film to improve the outdoor durability. UV blocking agents suitable for this application are typically benzotriazole based compounds, or other compounds capable of absorbing UV energy in the required region. Commercially available UV absorbing agents include, without limitation, TINUVIN 99, TINUVIN 400, TINUVIN 1130 from BASF, Ludwigshafen, Germany; and HOSTAVIN 3310 from Clariant; Muttenz, Switzerland. The amount of UV blocking agents can range from about 0 wt % to about 5 wt %.

Free radical scavengers may also be added to the top layer of the film to improve the weather durability of the top layer. Suitable free radical scavengers include but are not limited to TINUVIN 292, TINUVIN 123 DW from BASF, Ludwigshafen, Germany; and HOSTAVIN 3065 from Clariant, Muttenz, Switzerland. The amount of free radical scavengers can range from about 0 wt % to about 5 wt %.

Other UV blocking systems can also be used for improving weathering durability of this film. These include nano sized zinc oxide, and cerium oxide or combinations thereof which may be used to achieve the UV resistance required for the film. Suitable nano metal oxides include but are not limited to NANOBYK 3840, NANOBYK 3810 from BYK Additives, of Altana, Wesel, Germany. The total amount of UV blocking system additives may range from about 0 wt % to about 10 wt %. UV stabilizers and free radical scavengers can also be added to an intermediate layer, for example an adhesive layer.

Other additives can be used, such as for example, silicon dioxide and/or metal oxide particles to enhance the scratch resistance of the film. The other additives together range from about 0 wt % to about 5 wt % of the total film formulation. Suitable silicon dioxide particles include Minex 12 microparticles from Unimin Corporation and Nanobyk-3620 nanoparticles from BYK. Suitable metal oxides include Nanobyk-3600 aluminum oxide nanoparticles from BYK.

Additional components, such as thickeners, flow and leveling agents, slip agents, and rheology modifiers can be added to the film formulations to achieve desired coating quality. Examples of suitable thickeners include, without limitation, ACRYSOL RM-2020 NPR, TM8W, and UCAR POLYPHOBE 115 TR from Dow Chemicals, Midland, Mich. Examples of suitable flow and leveling agents include without limitation, Capstone FS-30, Capstone FS-35 from Dupont; Polyfox PF-156A from Omnova Solutions; Surfynol 104 from Air Products, and Masurf from Mason Chemical Company and others with similar chemistry. The percent incorporation for flow and leveling agents can vary from 0 wt % to 10 wt % in the film layer. Additional viscosity modifiers can be included in the formulation to modify the viscosity to a desired level and/or to impart desirable flow characteristics. Products like Rheolate 150, Rheolate 212, Rheolate 288, and Rheolate 350 from Elementis are typical examples that can be used in the formulations. The percent incorporation of viscosity modifiers can vary from between 0 wt % to 10 wt % in the film layer. Slip agents include, without limitation, Dow Corning 52, Dow Corning 54, and BYK 301 and can be added to the film formulation at about 0 wt % to about 10 wt %. Other components, such as water or isopropyl alcohol (IPA) can also be added to the formulation at about 0 wt % to about 10 wt %.

Cross-linking agents can be added to the film formulation to improve/modify the mechanical and chemical resistance properties of that film layer. In one embodiment, the cross-linking agent is included to the formulation at about 0 wt % to about 10 wt %. In another embodiment, the cross-linking agent is included to the formulation at about 1 wt % to about 3 wt %. In one embodiment, crosslinking occurs during the drying of the film composition. Examples of suitable cross-linking agents include, without limitation, polyaziridine based CX-100 from DSM Neo Resins, Waalwijk, The Netherlands; UCARLINK XL-25SE, ERL-4221, ERL-4234 from Dow Chemicals, Midland, Mich.; and COATOSIL 1770, SILQUEST A-187 from Momentive Performance Materials Inc., Waterford, N.Y.

Without limitation, other additives, for example, surfactants, defoamers, dispersants, wetting agents, dyes, pigments and co-solvents known to those skilled in the art can be added to the composition of the film layer.

As described herein, many embodiments of the films are free of PVC or at least substantially free of PVC. The term "substantially free" of PVC as used herein refers to relatively low concentrations of PVC in the film composition such as for example, less than 5%, in other embodiments less than 2%, in other embodiments less than 1%, in other embodiments less than 0.5%, and in still other embodiments less than 0.1%. As noted in certain embodiments, the films are free of PVC, i.e., the film(s) contain 0% PVC.

The film 100 can be generated using any process suitable for such purpose. In one embodiment, the film compositions were first deposited onto a removable support or carrier layer by techniques well known to those skilled in the art. Examples of such techniques include die coating, knife coating, curtain coating and reverse roll coating. The removable support can be separated after the compositions have been dried. An exemplary removable support can be selected from a group including a siliconized belt, a release paper, and a release film such as PET or other suitable materials.

Figure 2:
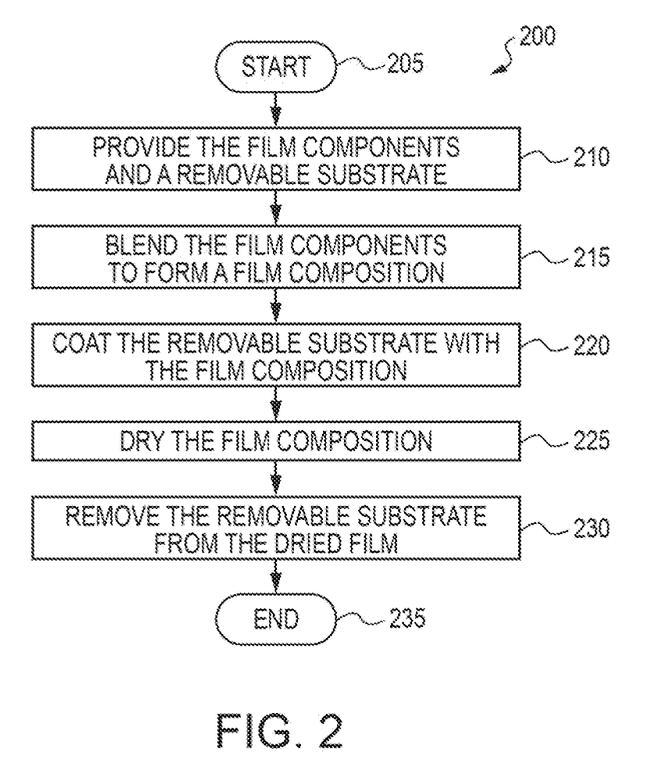
FIG. 2 is a block diagram illustrating an exemplary manufacturing process for making one embodiment of the film according to the present subject matter.

An exemplary method of making a film according to the present subject matter is illustrated in the block diagram 200 of FIG. 2. The process begins at operation 205. Operation 210 is to provide the film components and a removable support. Operation 215 provides that the film components are blended to form a film composition. In one embodiment, the film composition includes at least two different polyurethane polymers as described herein, and at least one of free radical scavenger and UV blocking agent. At operation 220, the removable support is coated with the film composition, such as by reverse roll coating, slot die coating, curtain coating or other acceptable methods. At operation 225, the film composition is dried. Drying may occur by using a heated or ambient air environment, curing or by other suitable methods. Alternatively, the film is further laminated with a pressure sensitive adhesive (PSA) coated release liner. At operation 230, the removable support is removed or separated from the dried film. The separation or removal can be accomplished by using a peel blade or knife which serves to separate the film from the carrier or support layer. Alternatively, the film can be separated by the carrier at a sharp angle so that the film can be easily picked up from the carrier or support. The film is rolled up and ready for use. Alternatively, the film can be cut and separated into sheets or sections of equivalent sizes or of varying lengths. The method ends at operation 235.

In addition to the foregoing, the film can be further overcoated with a varnish or other material to provide a glossy appearance. This operation may occur during the film forming process, after printing, or after collection or rolling up of the material after the production process has been completed.

The film of the present subject matter can be used in operative association with a graphic or other message. As used herein, operative association includes applying the film over the graphic or message, including wherein the graphic or message is part of a substrate, over which the film is applied. As used herein, operative association also includes the graphic or message being an additional layer, such as a printing layer or previously printed layer on the film. As used herein, operative association also includes applying a graphic or message over the film.

In certain versions of the present subject matter, the films exhibit a relatively high degree of transparency. That is, the film(s) may be optically transparent or at least substantially so. The term "transparent" as used herein and with reference to certain transparent films of the present subject matter refers to such films that exhibit a transparency of at least 60%, in other embodiments at least 70%, in still other embodiments at least 80%, in yet other embodiments at least 90%, in still further embodiments at least 95%, in other embodiments at least 98%, and in particular embodiments at least 99% as measured by ASTM D1746.

The film can be used as part of a printable media for outdoor applications, architectural and transportation type advertising campaigns and the like. The film can also be used as a protective film to be laminated over a subject, such as a protective laminate for electronic appliances, architectural, artistic or aesthetic elements, a retro-reflective license plate, a retro-reflective signage film, a name plate, a label, automotive exterior and interior parts, and the like. Additional exemplary uses may include safety signs, a graphic display, governmental mandated displays, military applications, or a surface that needs protection in an outdoor environment.

In one embodiment, the film also includes an adhesive layer. The adhesive can be a pressure sensitive adhesive, glue, and any other type of adhesives that are optically transparent, and when used to contact the printed indicia, would not affect the printed indicia. The adhesive may be pattern coated, and may be selected for particular properties such as permanent, removable or repositionable and the like. The adhesive can be random copolymer adhesives or block copolymer adhesives. Random copolymer adhesives include those based upon acrylic and/or methacrylic copolymers, α-olefin copolymers, silicone copolymers, chloroprene/acrylonitrile copolymers, and the like. Block copolymer adhesives including those based upon linear block copolymers (i.e., A-B and A-B-A type), branched block copolymers, star block copolymers, grafted or radial block copolymers, and the like, and natural and synthetic rubber adhesives. A description of useful pressure sensitive adhesives can be found in Encyclopedia of Polymer Science and Engineering, Vol. 13. Wiley-Interscience Publishers (New York, 1988). Additional descriptions of useful pressure sensitive adhesives can be found in Encyclopedia of Polymer Science and Technology, Vol. 1, Interscience Publishers (New York, 1964).

The film layer and the adhesive layer are substantially coextensive with one another, that is the edges and/or sides are aligned and in juxtaposition. It is of course possible, that the adhesive layer could be applied in a pattern on the film layer so that the layers are not completely juxtaposed on one another.

When pressure sensitive adhesives are used, a release liner can be used to protect the adhesive from inadvertent contact with unintended surfaces. Any release liner suitable for the chosen adhesive can be used. For pressure sensitive adhesives, release liners can be coated papers or films, and super calendared paper, for example. Coating materials suitable for release liners include, for example, silicone-based and fluorine-based materials, or any other material that has the desired releasing properties, for example, waxes and carbamates.

Figure 3:
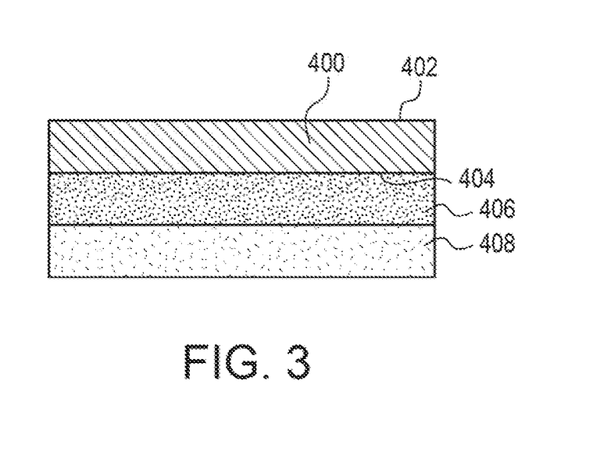
FIG. 3 is a sectional illustration of one exemplary embodiment of a film according to the present subject matter.

FIG. 3 illustrates one embodiment of the current subject matter. The transparent film 400 has a top face 402, a bottom face 404, an intermediate layer 406 and a release liner 408. Upon application, the release liner can be peeled off to expose a face of the intermediate layer 406, which in one embodiment is an adhesive. The film 400 can be attached to the surface to be protected through the adhesive layer 406. The intermediate layer 406 may include an adhesive layer, a tie coating layer or an adhesion promoting layer.

Figure 4:
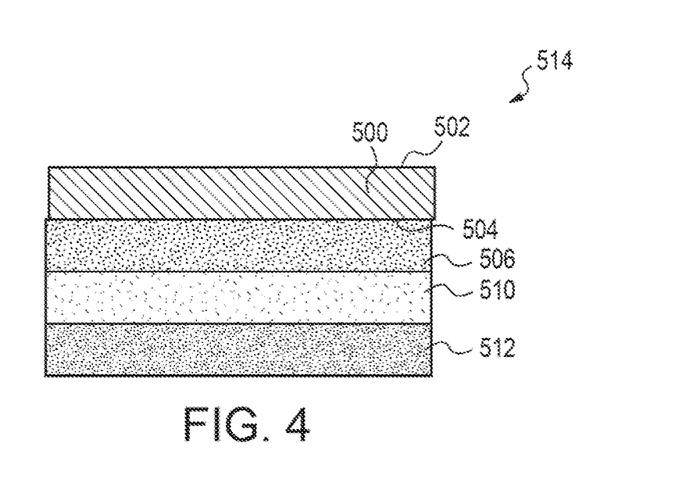
FIG. 4 is a sectional illustration of a further exemplary embodiment of a film laminate according to the present subject matter.

The film can also be used as part of a larger film laminate. FIG. 4 illustrates a cross-sectional view of one embodiment of a film laminate. The film laminate 514 is comprised of a transparent film 500 having a top face 502 and a bottom face 504, an adhesive layer 506, an ink layer 510, and an underlying substrate layer 512. Though referred to as an ink layer, the ink may not necessarily form a continuous layer. Various printable materials can be used as the underlying substrate layer. A non-PVC based printable material is used in one embodiment to make the whole film laminate non-PVC based. International patent application PCT/US08/84812 describes various films created using non-PVC compositions and is incorporated herein by reference in its entirety. Ink or toner anchor coatings, such as polyvinyl alcohol can be added to increase the anchorage of the printing to the laminate.

Figure 5:
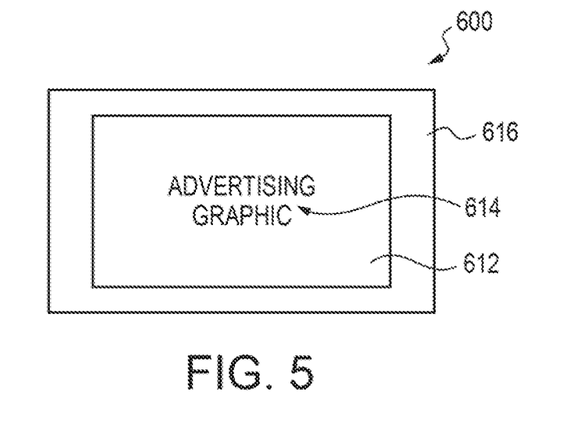
FIG. 5 illustrates the top view of an exemplary embodiment of an advertising graphic applied on a surface according to the present subject matter.

FIG. 5 illustrates a top view of an exemplary embodiment of a system 600 including an advertising graphic film laminate 612 applied to a surface 616 according to the present subject matter. The film laminate 612 bearing advertising graphic 614 is posted on a surface 616 through the use of an adhesive.

Figure 6:
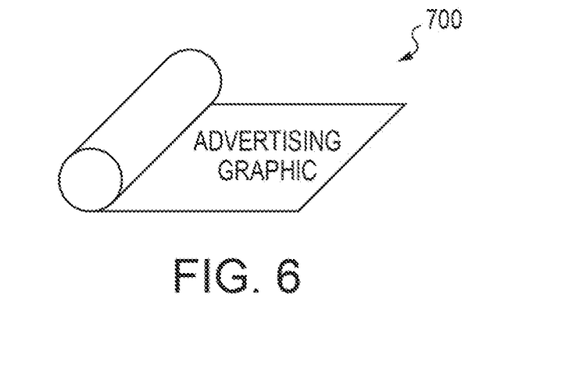
FIG. 6 illustrates an exemplary embodiment of a roll of an advertising graphic according to the present subject matter.

FIG. 6 illustrates an exemplary embodiment of a roll of the film laminate 700 according to the present subject matter.

Test Methods

Thickness

Film thickness is measured using TMI Model 49-70 Precision Micrometer available from Testing Machines Inc. in Ronkonkoma, N.Y. The specimen is placed between an upper and a lower anvil. The upper anvil rests on top of the specimen and the thickness is measured and displayed on the digital readout.

CIE L*a*b* Color Space

This test is used to describe the color of a sample. This 3-dimensional color space system was developed by the International Commission on Illumination (CIE), and defines L* as representing the lightness of the color, ranging from 0 (black) to 100 (white). In this system, a* represents the color's position along the red (magenta)/green axis, in which negative values represent green and positive values represent red or magenta, and b* represents the color's position along the blue/yellow axis, in which negative values represent blue and positive values represent yellow. The test is conducted using a COLOR I 5 Benchtop Spectrophotometer available from X-Rite, Inc., Grand Rapids, Mich. The test method is TAPPI T524 om-94.

Accelerated Weathering

Accelerated weathering test simulates the damaging effects of long term outdoor exposure of materials by exposing test samples to light, moisture and temperature extremes. A sample is tested and observed for light fastness (fading of colors), and weatherability (cracking, chalking, curling, shrinkage, etc. . . . ). An Atlas C165A Xenon Arc Weather-Ometer from Atlas Material Testing Technology LLC in Chicago, Ill. is used for this test.

A printing pattern with white, yellow, magenta, cyan and black stripes is first printed on a printable substrate. The film of the current subject matter, which may be transparent, translucent, clear or have other desirable optical properties, is then laminated over the print layer to make a film laminate through the use of a pressure sensitive adhesive. The sample is first tested for CIE L*a*b* Color Space before being placed in the Weather-Ometer. The sample is allowed to age in the Weather-Ometer for a designated amount of time. The sample is taken out of the Weather-Ometer for CIE L*a*b* Color Space reading and observation for any changes in shrinkage, chalking, cracking, etc. If there is no visible change after 2000 hours, and the changes in L*, a* and b* together, represented by ΔE, is less than 10, the sample is given a pass grade. ΔE value is calculated using the following formula:

$$\Delta E = \sqrt{(\Delta L^2 + \Delta a^2 + \Delta b^2)}.$$

Gloss

Gloss is measured using a BYK Gardner Micro-TRI-Gloss Gloss Meter from BYK Gardner USA in Columbia, Md. The universal measurement angle 60° is used for the measurement. Typically, the acceptable gloss reading is 80 or higher.

Tensile Strength and Tensile Elongation

The tensile elongation and tensile strength of the film is tested using Instron Model 5542 from Instron Co. in Canton, Mass. A modified ASTM D882 was used to determine the tensile strength and percentage elongation of the films of the present subject matter. The procedure is as follows:

1. A 1 inch wide by 4 inch long (25.4 mm×101.6 mm) specimen was cut from the film with the 4 inch length being parallel to the machine direction of the film.
2. The film was gripped across the 1 inch width at both ends, so that the separation between the grips is 2 inches (50.8 mm).
3. The crosshead speed was set at 12 inches per minute ("ipm") (304.8 mm per minute).
4. The tensile strength was obtained, which is the product of (tensile stress) x (thickness of the film). The tensile strength at break is the product of (maximum stress that occurs at break)×(thickness of the film).
5. The percent elongation is reported by the machine.

The standard for passage requires a minimum ultimate elongation of 180% and a minimum tensile strength of 0.5 pound per square inch ("psi") (6,895 N/m$^2$). The presence or absence of pressure sensitive adhesive (PSA) on the film does not appreciably alter the strength and/or elongation of the film. As such, wherever the film in the examples below includes PSA, the tensile elongation test was performed using the same film but without the layer of PSA.

Rivet Testing

Test samples approximately 2.5 inch (63.5 mm)×2.5 inch (63.5 mm) are applied over painted 4 inch (101.6 mm)×12 inch (304.8 mm) aluminum panels from Frontier Tank Center in Richfield, Ohio. Brazier rivet heads which are 11.4 mm (diameter)×3.3 mm (height)×7.62 mm (shaft diameter) (0.45" (diameter)×0.13" (height)×0.3" (shaft diameter)) are uniformly distributed over the aluminum panel. Application is done so as to minimize forming any wrinkles especially around these rivet heads. Entrapped air is released with the use of pin pricks while a brush with hard bristles and plastic squeegee is used to conform the film around the rivet. The sample is dwelled for 24 hours at ambient conditions. After this time, the diameter of the lifted portion of the film around the rivet is measured and recorded. The sample is then placed in Atlas Ci5000 Xenon Arc Weather-Ometer from Atlas Electric Devices Co. in Chicago, Ill., using a UVB 313 bulb for 1000 hours. The sample is then taken out and the diameter of the film lifted around the rivets is measured again. When the change in diameter is less than 0.0625 inch (1.58 mm), the sample is given a pass grade.

Shrinkage Test

Test sample is coated with a pressure sensitive adhesive under the trade name S8072 from Avery Dennison Corporation in Pasadena, Calif. at about 30 gram per square meter (g/m$^2$) coat weight. The sample is then attached to a clean aluminum panel from 0-Lab Corporation of Cleveland, Ohio. The sample is dwelled at ambient condition for 24 hours. A 5 inch (127 mm) cross hatch in both machine direction (MD) and cross-machine direction (CD) are made on the film. The sample is then aged at 160° F. (71° C.) for 48 hours. The dimension change in the MD and CD are measured. If the shrinkage is less than 0.33% in both directions, the sample is given a pass grade.

EXAMPLES

The materials used in the following examples are listed in Table 1 with information on the function, supplier and location of each.

TABLE 1

| Material | Function | Supplier | Location |
|---|---|---|---|
| Bondthane UD-255 | Base polymer | Bond Polymer International | Seabrook, New Hampshire |
| Bondthane UD-275 | Base polymer | Bond Polymer International | Seabrook, New Hampshire |
| Tinuvin 400 | UV absorbant | BASF | Ludwigshafen, Germany |
| Tinuvin 99 | UV absorbant | BASF | Ludwigshafen, Germany |
| Tinuvin 292 | Radical scavenger | BASF | Ludwigshafen, Germany |
| Byk 024 | Defoamer | Byk | Wesel, Germany |
| Surfynol 104BC | Wetting agent | Air products | Allentown, Pennsylvania |
| Byk 301 | Slip agent | Byk | Wesel, Germany |
| Rheolate 350 | Rheology modifier | Elementis specialties | East Windsor, New Jersey |
| Rheolate 150 | Rheology modifier | Elementis specialties | East Windsor, New Jersey |
| Neorez cx-100 | Crosslinker | DSM | Heerlen, Netherlands |

Table 2 lists four examples of formulations used to create the film. All component percentages are by weight.

TABLE 2

| | Example No. | | | |
|---|---|---|---|---|
| | 1 wt % | 2 wt % | 3 wt % | 4 wt % |
| Bondthane UD-255 | 63.78 | 63.78 | 53.78 | 63.58 |
| Bondthane UD-275 | 27.34 | 27.34 | 37.34 | 27.14 |
| Tinuvin 400 | 1.14 | 0 | 0 | 0 |
| Tinuvin 99 | 1.14 | 1.14 | 1.14 | 1.14 |
| Tinuvin 292 | 1.14 | 1.14 | 1.14 | 1.14 |
| Byk 024 | 0.01 | 0.01 | 0.01 | 0.01 |
| Surfynol 104BC | 0.05 | 0.05 | 0.05 | 0.05 |
| Byk 301 | 0 | 1.14 | 1.14 | 1.14 |
| Rheolate 350 | 0.63 | 0.63 | 0.63 | 0.63 |
| Rheolate 150 | 0.51 | 0.51 | 0.51 | 0.51 |
| Neorez cx-100 | 0.76 | 0.76 | 0.76 | 1.16 |
| Total wt % | 96.5 | 96.5 | 96.5 | 96.5 |

Examples 1 to 4

Film Compositions

In Examples 1 to 4 the balance 3.5 wt % comprises water, as some components have been diluted before mixing.

Table 3 lists four examples of film thicknesses. Examples 5 to 8 were formed using film compositions, Examples 1 to 4 respectively, to form the film.

TABLE 3

| | Example No. | | | |
|---|---|---|---|---|
| | 5 | 6 | 7 | 8 |
| Thickness (mils) | 1.0 | 1.2 | 1.4 | 1.6 |

Examples 5 to 8

Films

Film Examples 5 to 8 have been tested for various properties. The thickness of the films has been measured and the films have been tested for gloss at 60 degrees, tensile elongation, scratch resistance, and shrinkage. The films have been subjected to the accelerated weathering and rivet testing. For scratch resistance and shrinkage test, each sample is coated with about 30 g/m² of a pressure sensitive adhesive under the trade name S8072 from Avery Dennison Corporation in Pasadena, Calif. For accelerated weathering and rivet testing, the adhesive coated sample is further laminated onto a printable film. The printable film is Example No. 29B in the PCT application PCT/US08/84812, which has been incorporated by reference herein in its entirety.

Table 4 lists the properties measured for each of Examples 5 to 8. All examples have passed the accelerated weathering test, have a gloss higher than 90 when measured at 60°, and tensile elongation higher than 200. All of the samples have passed the scratch resistance test, rivet testing, and shrinkage test.

TABLE 4

| | Example No. | | | |
|---|---|---|---|---|
| | 5 | 6 | 7 | 8 |
| Thickness (mils) | 1 | 1.2 | 1.4 | 1.6 |
| Accelerated Weathering Test | Pass | Pass | Pass | Pass |
| Gloss @ 60° | >80 | >80 | >80 | >80 |
| Tensile Elongation | >250 | >250 | >250 | >250 |
| Rivet test | Pass | Pass | Pass | Pass |
| Shrinkage test | pass | pass | pass | pass |

All patents, published applications, and articles noted herein are hereby incorporated by reference in their entirety.

All of the features disclosed in the specification, including the claims, abstract, and drawings, and all of the operations in any method or process disclosed, may be combined in any combination, except combinations where at least some of such features and/or operations are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features. Publications, patents and patent applications are referred to throughout this disclosure. All references cited herein are hereby incorporated by reference.

The foregoing detailed description of the present subject matter is provided for purposes of illustration, and it is not intended to be exhaustive or to limit the subject matter to the particular embodiments disclosed. The embodiments may provide different capabilities and benefits, depending on the configuration used to implement the key features of the subject matter. Accordingly, the scope of the subject matter is defined only by the following claims.

What is claimed is:

1. A protective film comprising at least two different polyurethanes; wherein:
   the film is free or substantially free of polyvinyl chloride based polymer;
   each of the at least two different polyurethanes comprise at least one of polyurethane polymer, polyurethane prepolymer, and polyurethane copolymer;
   the at least two different polyurethanes are included in the film at an amount of from 70% to 99% by weight of the film;
   the film further comprises a third polymer, wherein said third polymer is a polymer, co-polymer, prepolymer, or hybrid polymer selected from the group consisting of vinyl acetate, olefin, and combinations thereof;
   the at least two different polyurethanes and third polymers are mixed together; and
   the film passes a rivet test in which (i) the film is applied over a painted aluminum panel having brazier rivet heads uniformly distributed over the aluminum panel such that the film is conformed around each rivet, (ii) the applied film and panel is dwelled for 24 hours at ambient conditions, (iii) a portion of the film around a rivet is then lifted and the diameter measured, (iv) the applied film and panel are then subjected to accelerated weathering including exposure to UV for 1,000 hours, and (v) after the accelerated weathering the portion of the lifted film is measured again and the diameter is compared to the measured diameter prior to accelerated weathering and the change in diameter is less than 0.0625 in (1.58 mm).

2. The film as recited in claim 1, wherein the film comprises:
   a first polyurethane having an ultimate elongation less than 200%, and a second polyurethane having an ultimate elongation more than 400%.

3. The film as recited in claim 1, wherein the first polyurethane and the second polyurethane are included at a weight ratio from about 80:20 to about 20:80 of the first polyurethane to the second polyurethane.

4. The film as recited in claim 1, further comprising at least one additive in the film selected from the group consisting of UV stabilizing agents, free-radical scavengers, cross-linking agents, thickeners, flow and leveling agents, rheology modifiers, surfactants, defoamers, dispersants, wetting agents, dyes, pigments, co-solvents, slip agents, water, isopropyl alcohol and combinations thereof.

5. The film as recited in claim 1, further comprising an adhesive layer in contact with a surface of the film.

6. The film as recited in claim 1, wherein the film exhibits a minimum ultimate elongation of 180% and a minimum tensile strength of 0.5 pound per square inch.

7. The film as recited in claim 1, wherein the film passes a shrinkage test in which (i) the film is adhered to an aluminum panel, (ii) the adhered film and panel are dwelled for 24 hours at ambient conditions, (iii) a 5 inch (127 mm) cross hatch is made on the film in both a machine direction and a cross direction, (iv) the film and panel are then aged at 160° F. (71° C.) for 48 hours, (v) the dimensional change in the machine direction and the cross direction are measured, and (vi) the shrinkage is less than 0.33% in both machine and cross directions.

8. A film laminate comprising a top layer, an intermediate layer, and a substrate layer, wherein:
   the top layer is a film comprising at least two different polyurethanes and is free or substantially free of polyvinyl chloride based polymer;
   each of the at least two different polyurethanes comprising at least one of polyurethane polymer, polyurethane prepolymer, and polyurethane copolymer;
   the substrate layer has printed or image indicia thereon;
   the at least two different polyurethanes are included in the film at an amount of from 70% to 99% by weight of the film;
   the top layer further comprises a third polymer, wherein said third polymer is a polymer, co-polymer, prepolymer, or hybrid polymer selected from the group consisting of styrene, vinyl acetate, olefin, and combinations thereof;
   the at least two different polyurethanes and third polymer are mixed together; and
   the film passes a rivet test in which (i) the film is applied over a painted aluminum panel having brazier rivet heads uniformly distributed over the aluminum panel such that the film is conformed around each rivet, (ii) the applied film and panel is dwelled for 24 hours at ambient conditions, (iii) a portion of the film around a rivet is then lifted and the diameter measured, (iv) the applied film and panel are then subjected to accelerated weathering including exposure to UV for 1,000 hours, and (v) after the accelerated weathering the portion of the lifted film is measured again and the diameter is compared to the measured diameter prior to accelerated weathering and the change in diameter is less than 0.0625 in (1.58 mm).

9. The film laminate as recited in claim 8, wherein the intermediate layer is selected from a group consisting of an adhesive layer, a tie coating layer, and an adhesive promotion layer.

10. The film laminate as recited in claim 8, further including at least one additive in the top layer, selected from the group consisting of UV stabilizing agents, free-radical scavengers, cross-linking agents, thickeners, flow and leveling agents, rheology modifiers, surfactants, defoamers, dispersants, wetting agents, dyes, pigments, co-solvents, slip agents, water, isopropyl alcohol and combinations thereof.

11. The film laminate as recited in claim 8 wherein the film exhibits a minimum ultimate elongation of 180% and a minimum tensile strength of 0.5 pound per square inch.

12. The film laminate as recited in claim 8, wherein the film passes a shrinkage test in which (i) the film is adhered to an aluminum panel, (ii) the adhered film and panel are dwelled for 24 hours at ambient conditions, (iii) a 5 inch (127 mm) cross hatch is made on the film in both a machine direction and a cross direction, (iv) the film and panel are then aged at 160° F. (71° C.) for 48 hours, (v) the dimensional change in the machine direction and the cross direction are measured, and (vi) the shrinkage is less than 0.33% in both machine and cross directions.

13. The film laminate as recited in claim 8, wherein the top layer includes a first polyurethane having an ultimate elongation less than 200%, and a second polyurethane having an ultimate elongation more than 400%.

14. The film laminate as recited in claim 13, wherein the first polyurethane and the second polyurethane are included at a weight ratio from about 80:20 to about 20:80 of the first polyurethane to the second polyurethane.

15. An advertising or informational graphic, comprising a surface having promotional indicia provided thereon, a film having front and back faces, the back face being attached to the surface, and an adhesive layer disposed between the back face and the surface, wherein:
the adhesive attaches the back face of the film to the surface;
the film comprises at least two different polyurethanes and is free or substantially free of polyvinyl chloride based polymer;
each of the at least two different polyurethanes comprising at least one of polyurethane polymer, polyurethane prepolymer, and polyurethane copolymer;
the at least two different polyurethanes are included in the film at an amount of from 70% to 99% by weight of the film;
the film further comprises a third polymer, wherein said third polymer is a polymer, co-polymer, prepolymer, or hybrid polymer selected from the group consisting of styrene, vinyl acetate, olefin, and combinations thereof;
the at least two different polyurethanes and third polymer are mixed together; and
the film passes a rivet test in which (i) the film is applied over a painted aluminum panel having brazier rivet heads uniformly distributed over the aluminum panel such that the film is conformed around each rivet, (ii) the applied film and panel is dwelled for 24 hours at ambient conditions, (iii) a portion of the film around a rivet is then lifted and the diameter measured, (iv) the applied film and panel are then subjected to accelerated weathering including exposure to UV for 1,000 hours, and (v) after the accelerated weathering the portion of the lifted film is measured again and the diameter is compared to the measured diameter prior to accelerated weathering and the change in diameter is less than 0.0625 in (1.58 mm).

16. The graphic as recited in claim 15, wherein:
the film includes a first polyurethane having an ultimate elongation less than 200%, and a second polyurethane having an ultimate elongation more than 400%; and
the first polyurethane and the second polyurethane are included at a weight ratio from about 80:20 to about 20:80 of the first polyurethane to the second polyurethane.

17. The graphic recited in claim 15, wherein the film exhibits a minimum ultimate elongation of 180% and a minimum tensile strength of 0.5 pound per square inch.

18. The graphic as recited in claim 15, wherein the film passes a shrinkage test in which (i) the film is adhered to an aluminum panel, (ii) the adhered film and panel are dwelled for 24 hours at ambient conditions, (iii) a 5 inch (127 mm) cross hatch is made on the film in both a machine direction and a cross direction, (iv) the film and panel are then aged at 160° F. (71° C.) for 48 hours, (v) the dimensional change in the machine direction and the cross direction are measured, and (vi) the shrinkage is less than 0.33% in both machine and cross directions.

19. An advertising or informational graphic, comprising:
a surface;
an adhesive layer;
a printable substrate having front and back faces, the back face facing the surface and in contact with the adhesive layer, and the front face having promotional indicia provided thereon; and
a transparent film having a top face and a bottom face, with the bottom face facing the front face of the printable substrate;
wherein:
the transparent film comprises at least two different polyurethanes, and is free or substantially free of polyvinyl chloride based polymer, each of the at least two different polyurethanes comprising at least one of polyurethane polymer, polyurethane prepolymer, and polyurethane copolymer;
the at least two different polyurethanes are included in the film at an amount of from 70% to 99% by weight of the film;
the film further includes a third polymer, wherein said third polymer is a polymer, co-polymer, prepolymer, or hybrid polymer selected from the group consisting of styrene, vinyl acetate, olefin, and combinations thereof; and
the at least two different polyurethanes and third polymer are mixed together; and
the film passes a rivet test in which (i) the film is applied over a painted aluminum panel having brazier rivet heads uniformly distributed over the aluminum panel such that the film is conformed around each rivet, (ii) the applied film and panel is dwelled for 24 hours at ambient conditions, (iii) a portion of the film around a rivet is then lifted and the diameter measured, (iv) the applied film and panel are then subjected to accelerated weathering including exposure to UV for 1,000 hours, and (v) after the accelerated weathering the portion of the lifted film is measured again and the diameter is compared to the measured diameter prior to accelerated weathering and the change in diameter is less than 0.0625 in (1.58 mm).

20. The advertising graphic as recited in claim 19, wherein:
the film includes a first polyurethane having an ultimate elongation less than 200%, and a second polyurethane having an ultimate elongation more than 400%, and
the first and second polyurethane are included at a weight ratio from about 80:20 to about 20:80 of the first polyurethane to the second polyurethane.

21. The advertising graphic as recited in claim 19, wherein the adhesive layer includes an adhesive selected from the group consisting of a permanent adhesive, a removable adhesive, a repositionable adhesive, and combinations thereof.

22. The advertising graphic as recited in claim 19, wherein the substrate includes a print layer.

23. The advertising graphic as recited in claim 19, further including at least one additive in the film, selected from the group consisting of UV stabilizing agents, free-radical scavengers, cross- linking agents, thickeners, flow and leveling agents, rheology modifiers, surfactants, defoamers, dispersants, wetting agents, dyes, pigments, co-solvents, slip agents, water, isopropyl alcohol and combinations thereof.

24. The advertising graphic as recited in claim 19, wherein the film exhibits a minimum ultimate elongation of 180% and a minimum tensile strength of 0.5 pound per square inch.

25. The advertising graphic as recited in claim 19, wherein the film passes a shrinkage test in which (i) the film is adhered to an aluminum panel, (ii) the adhered film and panel are dwelled for 24 hours at ambient conditions, (iii) a 5 inch (127 mm) cross hatch is made on the film in both a machine direction and a cross direction, (iv) the film and panel are then aged at 160° F. (71° C.) for 48 hours, (v) the dimensional change in the machine direction and the cross direction are measured, and (vi) the shrinkage is less than 0.33% in both machine and cross directions.

26. A roll or sheet of graphic advertising comprising a film layer and advertising indicia, wherein:
- the film layer includes a first polyurethane having an ultimate elongation less than 200%, a second polyurethane having an ultimate elongation more than 400%, and is free or substantially free of polyvinyl chloride based polymer, each of the first polyurethane and the second polyurethane comprising at least one of polyurethane polymer, polyurethane prepolymer, and polyurethane copolymer; and
- the film layer is provided in operative association with the advertising indicia;
- the at least two different polyurethanes are included in the film at an amount of from 70% to 99% by weight of the film;
- the film further includes a third polymer, wherein said third polymer is a polymer, co-polymer, prepolymer, or hybrid polymer selected from the group consisting of styrene, vinyl acetate, olefin, and combinations thereof;
- the at least two different polyurethanes and third polymer are mixed together; and
- the film passes a rivet test in which (i) the film is applied over a painted aluminum panel having brazier rivet heads uniformly distributed over the aluminum panel such that the film is conformed around each rivet, (ii) the applied film and panel is dwelled for 24 hours at ambient conditions, (iii) a portion of the film around a rivet is then lifted and the diameter measured, (iv) the applied film and panel are then subjected to accelerated weathering including exposure to UV for 1,000 hours, and (v) after the accelerated weathering the portion of the lifted film is measured again and the diameter is compared to the measured diameter prior to accelerated weathering and the change in diameter is less than 0.0625 in (1.58 mm).

27. The roll or sheet of graphic advertising as recited in claim 26, wherein the first polyurethane and the second polyurethane are included at a weight ratio from about 80:20 to about 20:80 of the first polyurethane to the second polyurethane.

28. The roll or sheet of graphic advertising as recited in claim 26, further including a substrate layer provided over the film layer, wherein the substrate layer includes a print layer.

29. The roll or sheet of graphic advertising film as recited in claim 26, further including at least one additive in the film layer selected from the group consisting of UV stabilizing agents, free-radical scavengers, cross-linking agents, thickeners, flow and leveling agents, rheology modifiers, surfactants, defoamers, dispersants, wetting agents, dyes, pigments, co-solvents, slip agents, water, isopropyl alcohol, and combinations thereof.

30. The roll or sheet of graphic advertising as recited in claim 26, wherein the film exhibits a minimum ultimate elongation of 180% and a minimum tensile strength of 0.5 pound per square inch.

31. The roll or sheet of graphic advertising as recited in claim 26, wherein the film passes a shrinkage test in which (i) the film is adhered to an aluminum panel, (ii) the adhered film and panel are dwelled for 24 hours at ambient conditions, (iii) a 5 inch (127 mm) cross hatch is made on the film in both a machine direction and a cross direction, (iv) the film and panel are then aged at 160° F. (71° C.) for 48 hours, (v) the dimensional change in the machine direction and the cross direction are measured, and (vi) the shrinkage is less than 0.33% in both machine and cross directions.

32. The roll or sheet of graphic advertising as recited in claim 26, further including an adhesive layer provided on the film layer.

33. The roll or sheet of graphic advertising as recited in claim 32, further including a release layer provided over the adhesive layer.

* * * * *